United States Patent
Moik

(10) Patent No.: US 11,913,794 B2
(45) Date of Patent: Feb. 27, 2024

(54) DETERMINING A VEHICLE TRAJECTORY UTILIZING BOUNDARY COST FUNCTIONS

(71) Applicant: Robert Bosch GmbH, Stuttgart (DE)

(72) Inventor: Fabian Moik, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 276 days.

(21) Appl. No.: 17/038,433

(22) Filed: Sep. 30, 2020

(65) Prior Publication Data
US 2021/0123755 A1    Apr. 29, 2021

(30) Foreign Application Priority Data
Oct. 24, 2019   (DE) .......................... 102019216378.5

(51) Int. Cl.
*G01C 21/34* (2006.01)
*B60W 30/095* (2012.01)
(Continued)

(52) U.S. Cl.
CPC ......... *G01C 21/3453* (2013.01); *B60W 10/04* (2013.01); *B60W 10/18* (2013.01);
(Continued)

(58) Field of Classification Search
CPC ........... G01C 21/3453; G01C 21/3407; B60W 10/04; B60W 10/18; B60W 10/20; B60W 30/09; B60W 30/0956; B60W 30/143; B60W 50/14; B60W 60/0013; B60W 60/0015; B60W 2554/20; B60W 2554/40; B60W 30/08; B60W 40/10; G05D 1/0217; G05D 2201/0213; G08G 1/166
See application file for complete search history.

(56) References Cited

U.S. PATENT DOCUMENTS

| 11,262,756 B2* | 3/2022 | Phillips ................. B60W 30/12 |
| 11,262,759 B2* | 3/2022 | Phillips ............... B60W 30/093 |
| 2018/0059670 A1* | 3/2018 | Nilsson .................. G08G 1/167 |

FOREIGN PATENT DOCUMENTS

| DE | 102015221817 A1 | 5/2017 | |
| EP | 3579211 A1 * | 12/2019 | ........ B60W 30/0956 |

OTHER PUBLICATIONS

Bey, Henrik, et al. "Optimization-based tactical behavior planning for autonomous freeway driving in favor of the traffic flow." 2019 IEEE Intelligent Vehicles Symposium (IV). IEEE, 2019. (Year: 2019).*

* cited by examiner

*Primary Examiner* — Russell Frejd
*Assistant Examiner* — Ana D Thomas
(74) *Attorney, Agent, or Firm* — NORTON ROSE FULBRIGHT US LLP; Gerard A. Messina

(57) ABSTRACT

A computer-implemented method for calculating a trajectory of a mobile platform. An optimization problem whose total cost function depends on one or several boundary cost functions is solved. A first boundary cost function is, in at least one portion, a continuous and non-constant function of the position of the mobile platform. By way of continuous boundary cost functions, it is possible to achieve a continuous total cost function by which abrupt changes in the motion control of the mobile platform can be avoided. The boundary cost functions can be based on different elementary cost functions that make possible simple and flexible configuration of the motion control system.

10 Claims, 2 Drawing Sheets

(51) Int. Cl.
  *B60W 60/00* (2020.01)
  *B60W 30/09* (2012.01)
  *B60W 10/20* (2006.01)
  *B60W 10/04* (2006.01)
  *B60W 10/18* (2012.01)
  *B60W 50/14* (2020.01)
  *B60W 30/14* (2006.01)

(52) U.S. Cl.
  CPC ............ *B60W 10/20* (2013.01); *B60W 30/09* (2013.01); *B60W 30/0956* (2013.01); *B60W 30/143* (2013.01); *B60W 50/14* (2013.01); *B60W 60/0013* (2020.02); *B60W 60/0015* (2020.02); *B60W 2554/20* (2020.02); *B60W 2554/40* (2020.02)

DETERMINING A VEHICLE TRAJECTORY UTILIZING BOUNDARY COST FUNCTIONS

CROSS REFERENCE

The present application claims the benefit under 35 U.S.C. § 119 of German Patent Application No. DE 102019216378.5 filed on Oct. 24, 2019, which is expressly incorporated herein by reference in its entirety.

FIELD

The present invention relates to a method for determining a vehicle trajectory involving solving an optimization problem, the total cost function of the optimization problem depending on a boundary cost function that encompasses at least a continuous and non-constant portion.

BACKGROUND INFORMATION

In the future, vehicles will increasingly provide assisted-driving or autonomous driving functions, which will relieve stress on the driver and reduce the risk of accidents. Functions that are already available are, for example, adaptive cruise control systems or lane-keeping assistants. These functions require that a surroundings model be calculated from sensor data such as camera, radar, lidar, and/or ultrasonic data. Based on the surroundings model, a vehicle trajectory can be determined. This can be done by solving an optimization problem.

German Patent Application No. DE 10 2015 221 817 A1 describes a method for decentralized coordination of driving maneuvers of at least two motor vehicles, a planned and desired trajectory being conveyed from a first motor vehicle to a second motor vehicle.

The planned trajectory of the second motor vehicle is adapted based on the planned and desired trajectory of the first motor vehicle, a total cost function, which encompasses at least cost functions of the first and of the second motor vehicle, being optimized.

SUMMARY

In the context of the present invention, a method for calculating a trajectory of an "ego vehicle" is provided. The term "ego vehicle" refers hereinafter to the vehicle whose behavior is to be affected by the method. From the perspective of the ego vehicle, all other vehicles are "other vehicles."

An object of the present invention is to calculate a better vehicle trajectory. The intention in particular is to improve the user experience in the context of controlling the ego vehicle in accordance with the calculated trajectory.

A further object is that of making possible a simple yet flexible configuration of the motion control system of the ego vehicle.

A first aspect of the present invention relates to a computer-implemented method for calculating a trajectory of a mobile platform. In accordance with an example embodiment of the present invention, the method encompasses the solving of an optimization problem; a total cost function of the optimization problem depending on a first boundary cost function; and the first boundary cost function being a function of a position of the mobile platform which has a continuous and non-constant portion.

The mobile platform is preferably a vehicle, i.e., a mobile means of transport for transporting persons or things. The mobile platform can, however, also be an automated or partly automated mobile robot that does not necessarily serve to transport persons or things. Although the present invention is applicable to mobile platforms in general, in the interest of clarity it is described below for vehicles.

The first boundary cost function can correspond to a first object that results in a boundary of the permitted driving region. The first boundary cost function can depend on a position of the first object. The first object can be a static or a dynamic object. A static first object could be, for example, a roadway boundary line. A dynamic first object could be, for example, a preceding other vehicle. A plurality of positions can be associated with the first object. Those positions can correspond, for example, to the course of a roadway boundary line or to the outline of another vehicle. It is also possible for the first object to encompass a left and a right roadway boundary line, and for positions of the left and the right roadway boundary lines to be associated with the first object. The first boundary cost function can also depend on several positions of the first object.

The total cost function of the optimization problem can depend on a plurality of boundary cost functions. The total cost function of the optimization problem can furthermore depend on further cost functions, for instance a comfort cost function, a travel path cost function, and/or a target speed cost function. For example, the total cost function of the optimization problem can be a sum of a comfort cost function, a travel path cost function, a target speed cost function, and one or several boundary cost functions.

The first boundary cost function is, at least in a portion, a continuous and non-constant function of the position of the ego vehicle. Preferably the first boundary cost function is, in total, a continuous function of the position of the ego vehicle. In particular, the first boundary cost function does not increase abruptly from a minimum cost value to a maximum cost value when the position of the ego vehicle reaches the boundary, corresponding to the first object, of the permitted driving region. Instead, the first boundary cost function can increase continuously when the ego vehicle approaches the boundary of the permitted driving region. In particular, the boundary cost function assumes several different intermediate values between the minimum cost value and the maximum cost value when the ego vehicle approaches the boundary of the permitted driving region. An approach by the ego vehicle to the boundary, depending on the position of the first object, of the permitted driving region can thus be acted upon by costs at an early stage. An approach by the ego vehicle to the boundary, corresponding to the first object, of the permitted driving region can thus be continually counteracted with higher and higher costs, the closer the ego vehicle comes to the boundary of the permitted driving region.

The optimization variables of the optimization problem can encompass, in particular, the trajectory of the ego vehicle. The trajectory encompasses time-dependent positions of the ego vehicle.

The optimization problem can furthermore encompass one or several conditions. The optimization problem can encompass as a condition, for example, the fact that acceleration and/or abrupt transitions do not quantitatively exceed respective maximum values. The maximum values can depend on sensor data; the sensor data can indicate, for example, a dry, wet, or icy road surface. The optimization problem can furthermore encompass conditions that prevent boundaries of the permitted driving region from being transgressed; the boundaries can correspond to static and/or dynamic objects.

According to an example embodiment of the present invention, the method further encompasses determining the first boundary cost function, the determination of the first boundary cost function being based on a classification of a first object as a static or dynamic object, on a position of the first object, and on an elementary cost function from a set of elementary cost functions. The set of elementary cost functions encompasses: a first elementary cost function for avoiding a collision with a static object, a second elementary cost function for maintaining a safe distance from a static object, a third elementary cost function for conforming to a preferred static driving region, a fourth elementary cost function for avoiding a collision with a dynamic object, a fifth elementary cost function for maintaining a safe distance from a dynamic object, and/or a sixth elementary cost function for conforming to a preferred dynamic driving region.

If the first object is a static object, the first boundary cost function can be based on the first, the second, or the third elementary cost function. On the other hand, if the first object is a dynamic object, the first boundary cost function can be based on the fourth, the fifth, or the sixth elementary cost function.

The first boundary cost function can depend on one or several positions of the first object. The first boundary cost function can furthermore depend on positions of further objects. The first boundary cost function can depend in particular on positions of several static objects. Alternatively thereto, the first boundary cost function can depend on positions of several dynamic objects.

A particular advantage of the example method can be the fact that the elementary cost functions of the set of elementary cost functions are determined only once, but are then applicable to a plurality of static and dynamic objects.

The elementary cost functions can each have a first, a second, and a third range. For example, in a first range an elementary cost function can be constantly equal to a minimum cost value. The minimum cost value can be equal to zero. The second range of the elementary cost function can adjoin the first range. The second range of the elementary cost function can furthermore extend to a boundary of the permitted driving region. In the second range, the elementary cost function preferably rises continuously from the minimum cost value. In particular, in the second range the elementary cost function can rise to a maximum cost value. The elementary cost functions can have different minimum and maximum cost values. When reference is made hereinafter to the "steepness" of an elementary cost function, what is meant thereby is an indication of the slope of the elementary cost function in the second range. For example, the steepness of an elementary cost function can be the average slope or maximum slope of the elementary cost function in the second range. The continuous and non-constant portion of the first boundary cost function can correspond to the second range of an elementary cost function or to a part of the second range. An elementary cost function can furthermore have a third range. The third range of an elementary cost function can correspond to a transgression of the boundary of a permitted driving region. In the third range, the boundary cost function can be constantly equal to a maximum cost value. The maximum cost value can correspond to a numerically representable maximum value of the data processing system or to a fraction of that maximum value. Preferably, the elementary cost functions are in total continuous functions. Furthermore, the elementary functions are preferably convex functions in their first and second ranges.

The first elementary cost function can be embodied to avoid a collision with a static object. A boundary cost function based on the first elementary cost function can be embodied, for example, to limit the permitted driving region to the position of a guardrail. The first elementary cost function can have a high steepness.

The second elementary cost function can be embodied to maintain a safe distance from a static object, for instance a guardrail. The second elementary cost function can have a moderate steepness.

The third elementary cost function can be embodied to conform to a preferred static driving region. The ego vehicle should depart from the preferred static driving region only for comfort reasons. Within the preferred static driving region, the third elementary cost function can be constantly equal to zero. The greater the distance from the preferred static driving region, the larger the values that the third elementary cost function can assume. The third elementary cost function preferably has a low steepness.

The fourth elementary cost function can be embodied to avoid a collision with a dynamic object. A boundary cost function based on the fourth elementary cost function can be embodied, for example, to limit the permitted driving region to the position of a rear bumper of a preceding other vehicle. The fourth elementary cost function can have a high steepness.

The fifth elementary cost function can be embodied to maintain a safe distance from a dynamic object, for instance another vehicle. The fifth elementary cost function can have a moderate steepness.

The sixth elementary cost function can be embodied to conform to a preferred dynamic driving region. The ego vehicle should depart from the preferred dynamic driving region only for comfort reasons. Within the preferred dynamic driving region, the sixth elementary cost function can be constantly equal to zero. The greater the distance from the preferred dynamic driving region, the greater the values that the sixth elementary cost function can assume. The sixth elementary cost function preferably has a low steepness.

If the first object is a static object, and if the first boundary cost function is based on the i-th elementary cost function, where $1 \le i \le 3$, the first boundary cost function can be stated, for example, as follows:

$$\lambda_{i,static} = \int_{t_0}^{t_{end}} f_{i,static}(k_{i,static}(t), x(t), y_{i,left}(x_{i,left}), y_{i,right}(x_{i,right})) dt$$

where $t_0$ is the starting point in time of the trajectory of the ego vehicle, $t_{end}$ is the ending point in time of the trajectory of the ego vehicle, $f_{i,static}$ is the instantaneous boundary cost function based on the i-th elementary cost function, $k_{i,static}(t)$ is a possibly time-dependent weighting, $x(t)=x(t), y(t)^T$ is the time-dependent position of the ego vehicle in the global coordinate system, and $y_{i,left}(x_{i,left})$ and $y_{i,right}(x_{i,right})$ are left and right boundaries of the permitted driving region, which depend on the position of the first object and are likewise indicated in the global coordinate system. The boundaries $y_{i,left}(x_{i,left})$ and $y_{i,right}(x_{i,right})$ can depend on one or several positions of the first object. The boundaries $y_{i,left}(x_{i,left})$ and $y_{i,right}(x_{i,right})$ can furthermore depend on one or several positions of further static objects.

If the first object is a static object and the first boundary cost function is based on the i-th elementary cost function, where $4 \le i \le 6$, the first boundary cost function can be stated, for example, as follows:

$$\lambda_{i,dynamic} = \int_{t_0}^{t_{end}} f_{i,dynamic}(k_{i,dynamic}(t), x(t), x_{1,i}(t)) dt$$

where $f_{i,dynamic}$ is the instantaneous boundary cost function based on the i-th elementary cost function, $k_{i,dynamic}$ (is a possibly time-dependent weighting, and $x_{1,i}(t)=(x_{1,1}(t),y_{1,i}(t))^T$ represents a boundary, dependent on the position of the first dynamic object, of the permitted driving region. The boundary $x_{1,i}(t)$ can depend on one or several positions of the first object. Furthermore, $f_{i,dynamic}$ can depend on several boundaries $x_{j,i}(t)$ where $1 \leq j \leq J$ (not accounted for in the formula above), such that the j-th boundary can depend on positions of the j-th dynamic object, and J is the number of dynamic objects.

According to a further embodiment of the method in accordance with the present invention, the total cost function of the optimization problem furthermore depends on a second boundary cost function; the second boundary cost function depending on the position of the first object; and the first and the second boundary cost function being based on different elementary cost functions from the set of elementary cost functions.

The first and the second boundary cost function can thus depend on the position of the first object, the first and the second boundary cost function being based on different elementary cost functions from the set of elementary cost functions. It is also possible for the total cost function of the optimization problem to depend on three boundary cost functions that in turn depend on the position of the first object, and the three boundary cost functions each being based on different elementary cost functions. In particular, the three boundary cost functions can be based either on the first, the second, or the third elementary cost function. Alternatively, the three boundary cost functions can be based on the fourth, the fifth, and the sixth elementary cost function.

According to a further embodiment of the method in accordance with the present invention, the first elementary cost function has a higher steepness than the second elementary cost function, the second elementary cost function has a higher steepness than the third elementary cost function, the fourth elementary cost function has a higher steepness than the fifth elementary cost function, and/or the fifth elementary cost function has a higher steepness than the sixth elementary cost function.

According to a further embodiment, the elementary cost function on which the first boundary cost function is based is continuous and non-constant in at least one portion.

Preferably, all the elementary cost functions from the set of elementary cost functions are in total continuous functions. It is thereby possible to ensure that the corresponding boundary cost functions are continuous functions of the position of the ego vehicle.

The continuous and non-constant portion of the elementary cost function can be the above-described second region of the elementary cost function in which the elementary cost function rises from a minimum cost value to a maximum cost value. It is also possible for the continuous and non-constant portion of the elementary cost function to be part of the second region of the elementary cost function.

According to a further embodiment of the present invention, the method has the steps of: receiving user inputs; and configuring a specific elementary cost function from the set of elementary cost functions based on the user inputs. Configuration of the specific elementary cost function encompasses configuration of a shift parameter and/or configuration of a steepness of the elementary cost function.

The specific elementary cost function is any elementary cost function from the set of elementary cost functions. For example, the computer-implemented method can be embodied to prompt a user, in an initial phase, to configure the specific elementary cost function. Alternatively, the computer-implemented method can be embodied to enable selection of the configuration of the specific elementary cost function by the user.

The computer-implemented method can be embodied so that function values of the specific elementary cost function can be directly configured. Alternatively, the computer-implemented method can be embodied so that one or several parameters of the specific elementary cost function are configured. In particular, the method can be embodied so that a shift parameter of the specific elementary cost function is configured. The shift parameter can be, for example, the distance between an object that implements the boundary of the driving region and the point at which the first and second regions of the specific elementary cost function meet. Alternatively, the shift parameter can be the distance between the object that implements the boundary of the driving region and the point at which the second and third regions of the specific elementary cost function meet.

According to a further embodiment of the method in accordance with the present invention, the total cost function of the optimization problem further depends on a comfort cost function, on a travel path cost function, and/or on a target speed function.

The comfort cost function can be embodied to prevent high accelerations and/or severe abrupt transitions. The comfort cost function can, in particular, assume a minimum cost value when the speed of the ego vehicle is constant. The comfort cost function can represent a sum of an acceleration cost function and an abrupt-transition cost function. The greater the acceleration of the ego vehicle, the higher the value of the acceleration cost function can be. Analogously, the more severe the abrupt transitions of the ego vehicle, the higher the value of the abrupt-transition cost function can be.

The travel path cost function can be embodied to offer an incentive for the ego vehicle to proceed along the arc length of the roadway. The farther the trajectory of the ego vehicle extends along the arc length of the roadway, the lower the values that the travel path cost function can assume. On the other hand, the travel path cost function can assume a high value when the ego vehicle is not moving.

In accordance with an example embodiment of the present invention, the computer-implemented method can be embodied for input of a target speed by a user via human-machine interface. The target speed cost function can assume a value of zero when the speed of the ego vehicle is equal to the target speed. The further the speed of the ego vehicle deviates from the target speed, the higher the values that the target speed cost function can assume.

A second aspect of the present invention relates to a data processing system that executes the method according to the present invention.

The data processing system is, for example, a control device. The data processing system encompasses at least a processor and a memory unit. The processor can be, for example, a microprocessor, a microcontroller, or an application-specific processor. The memory unit preferably has a nonvolatile memory unit on which a computer program that is written for execution of the method according to the present invention is stored. The data processing system can encompass a plurality of further components, for example a communication unit by way of which the data processing system can communicate with a server so that parts of the computer program according to the present invention can be stored and/or executed on the server.

A third aspect of the present invention accordingly relates to a computer program, the computer program encompassing instructions that, upon execution of the program by a data processing system, cause the latter to execute the method according to the present invention.

According to an example embodiment of the present invention, the computer program encompasses a configuration module and a motion control module, the configuration module being embodied to configure the elementary cost functions based on user inputs, and the motion control module being embodied to solve the optimization problem.

Because the elementary cost functions can be applied to a plurality of different objects, simple and yet flexible configuration of the motion control system is made possible by way of the functions. One advantage can therefore be that of furnishing a simple yet flexible interface for configuration of the motion control system.

A fourth aspect of the present invention relates to a computer-readable memory medium on which the computer program according to the present invention is stored.

Control can be applied in particular to a steering system, a propulsion system, and/or a braking system of the ego vehicle in order to traverse the calculated trajectory.

Further explanations will be presented in further detail below, together with a description of preferred exemplifying embodiments of the present invention with reference to the figures.

DETAILED DESCRIPTION OF EXAMPLE EMBODIMENTS

Figure 1:
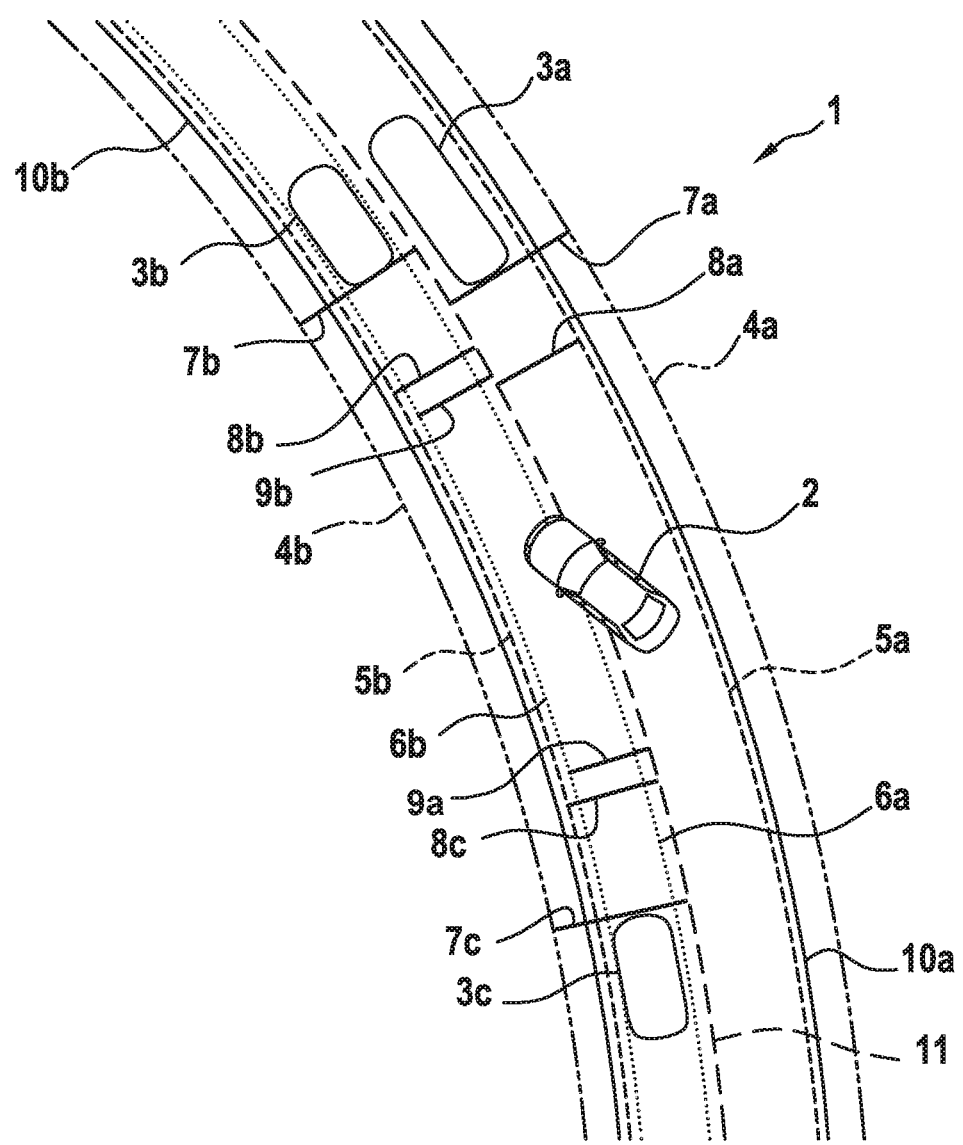
FIG. 1 shows exemplifying traffic situations with a visualization of boundary cost functions, in accordance with an example embodiment of the present invention.

FIG. 1 shows an exemplifying traffic situation 1 with an illustration of boundary cost functions that are relevant in that context. A two-lane roadway, having roadway boundaries 10a and 10b, is depicted. Broken center line 11 separates the two lanes from one another. Ego vehicle 2 is moving from the right lane into the left lane, for example in order to pass the preceding other vehicle 3a. Also depicted are other vehicles 3b and 3c that are driving in the left lane.

Dot-dash lines 4a and 4b illustrate a first boundary cost function. The first boundary cost function can be based on the first elementary cost function, the first elementary cost function being embodied to avoid a collision with a static object. In FIG. 1, the left and right guardrails of the roadway correspond to the static object. Dot-dash lines 4a and 4b can also reproduce the course of the guardrails. The first boundary cost function can be constantly equal to a maximum cost value both to the right of curve 4a and to the left of curve 4b. Starting from the boundaries of the permitted driving region which are depicted by lines 4a and 4b, the first boundary cost function can decrease respectively toward the center of the roadway. The first boundary cost function preferably decreases rapidly to a minimum cost value; the minimum cost value can be equal to zero.

Dashed lines 5a and 5b illustrate a second boundary cost function. The second boundary cost function can be based on the second elementary cost function, the second elementary cost function being embodied to maintain a safe distance from a static object. The left and right guardrails of the roadway can again correspond to the static object. Dashed lines 5a and 5b for maintaining a safe distance from the guardrails mark, in FIG. 1, a narrower permitted driving region than dot-dash lines 4a and 4b for avoiding a collision with the guardrails. The second boundary cost function can be constantly equal to a maximum cost value both to the right of curve 5a and to the left of curve 5b. Starting from boundaries 5a and 5b of the permitted driving region, the second boundary cost function can decrease respectively toward the center of the roadway. The second boundary cost function preferably decreases with moderate steepness to a minimum cost value; the minimum cost value can be equal to zero.

Dotted lines 6a and 6b illustrate a third boundary cost function. The third boundary cost function can be based on the third elementary cost function, the third elementary cost function being embodied to conform to a preferred static driving region. Because ego vehicle 2 is preparing to move into the left lane, the preferred static driving region is located in the left lane. The preferred static driving region can depend on positions of the roadway center line and on positions of the left roadway boundary line. The preferred static driving region can be at a certain distance from the roadway center line and from the left roadway boundary line. The third boundary cost function can be constantly equal, between dotted lines 6a and 6b, to a minimum cost value that can be zero. The third boundary cost function can furthermore rise, to the right of dotted curve 6a and to the left of dotted curve 6b, with increasing distance from the left lane. In particular, the third boundary cost can rise monotonically in those regions, the rise preferably having a low steepness.

Markings 7a, 7b, and 7c illustrate a fourth boundary cost function. The fourth boundary cost function can be based on the fourth elementary cost function, the fourth elementary cost function being embodied to avoid a collision with a dynamic object. Dynamic objects in FIG. 1 are, in particular, other vehicles 3a, 3b, and 3c. Markings 7a, 7b, and 7c can be disposed at positions respectively of the front and rear bumpers of other vehicles 3a, 3b, and 3c. The fourth boundary cost function can be constantly equal to a maximum cost function at the positions at which other vehicles are located, and the fourth boundary cost function can decrease from the maximum cost value at markings 7a, 7b, and 7c, the decrease in the fourth boundary cost function occurring away from the respective other vehicles. The fourth boundary cost function preferably decreases rapidly to a minimum cost value; the minimum cost value can be equal to zero.

Markings 8a, 8b, and 8c illustrate a fifth boundary cost function. The fifth boundary cost function can be based on the fifth elementary cost function, the fifth elementary cost function being embodied to maintain a safe distance from a dynamic object. Other vehicles 3a, 3b, and 3c, in particular, represent dynamic objects in FIG. 1. Markings 8a, 8b, and 8c for maintaining a safe distance from those vehicles in the surroundings of ego vehicle 2 mark out a smaller permitted driving region than markings 7a, 7b, and 7c for avoiding a collision with the other vehicles. The fifth boundary cost function can decrease from a maximum cost value at markings 8a, 8b, and 8c, the decrease in the fifth boundary cost function occurring substantially toward the ego vehicle. The fifth boundary cost function preferably decreases with a moderate steepness to a minimum cost value; the minimum cost value can be equal to zero.

Markings 9a and 9b illustrate a sixth boundary cost function. The sixth boundary cost function can be based on the sixth elementary cost function, the sixth elementary cost function being embodied to conform to a preferred dynamic driving region.

In FIG. 1 the preferred dynamic driving region is located in the left lane between markings 9a and 9b. The preferred dynamic driving region can depend on positions of other vehicles 3b and 3c. The sixth boundary cost function can be constantly equal, in the left lane between markings 9a and 9b, to a minimum cost value that can be zero. The sixth boundary cost function can furthermore, in the left lane proceeding from markings 9a and 9b, rise toward the respective other vehicles and beyond. In particular, the sixth boundary cost function can rise monotonically in those regions, the rise preferably having a low steepness.

The six boundary cost functions described above are preferably continuous, so that small changes in the position of ego vehicle 2 bring about small changes in the total cost function.

Figure 2:
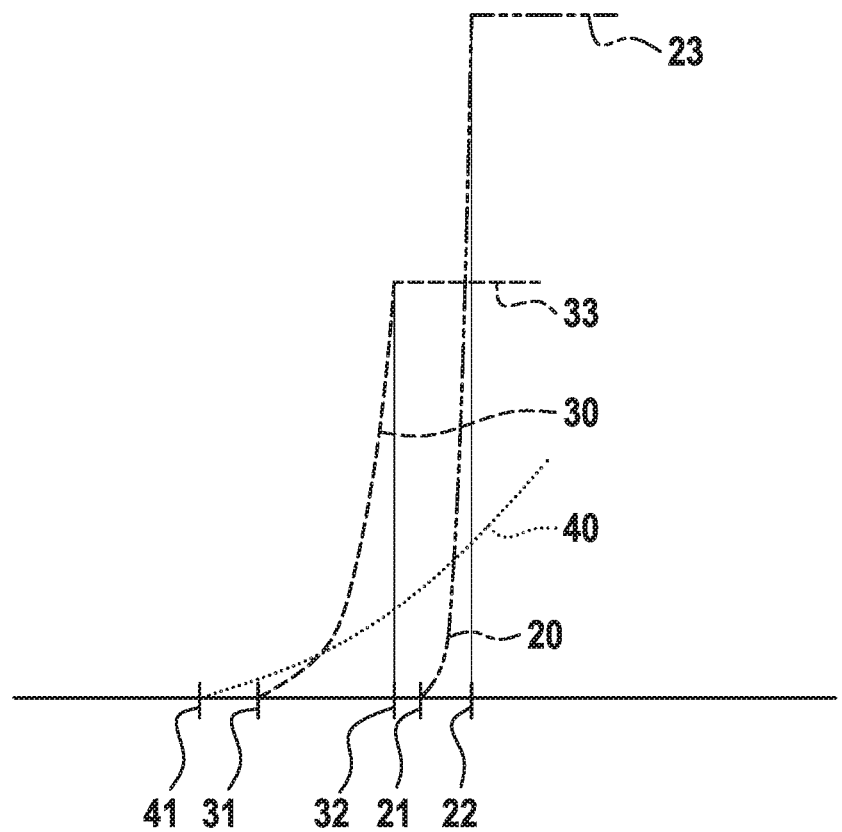
FIG. 2 shows examples of elementary cost functions in accordance with the present invention.

FIG. 2 illustrates, by way of example, elementary cost functions. The first elementary cost function is represented by dot-dash curve 20. In a first region to the left of marking 21, first elementary cost function 20 is constantly equal to a minimum cost value that can be equal to zero. In a second region between markings 21 and 22, first elementary cost function 20 rises to a maximum cost value 23. The first elementary cost function has a high steepness. In a third region to the right of marking 22, the first elementary cost function is constantly equal to the maximum cost value 23. Marking 22 in FIG. 2 can correspond to dot-dash lines 4a and 4b in FIG. 1. In other words, the first boundary cost function of FIG. 1 can be determined by configuring first elementary cost functions in such a way that markings 22 lie on lines 4a and 4b. Dot-dash lines 4a and 4b in FIG. 1 thus indicate the positions at which the first boundary cost function decreases from maximum cost value 23.

FIG. 2 furthermore depicts the second elementary cost function by way of dashed curve 30. In a first region to the left of marking 31, second elementary cost function 30 is constantly equal to a minimum cost value that can be equal to zero. In a second region between markings 31 and 32, second elementary cost function 30 rises to a maximum cost value 33. The second elementary cost function has a moderate steepness. In a third region to the right of marking 32, the second elementary cost function is constantly equal to maximum cost value 33. Marking 32 in FIG. 2 can correspond to dashed lines 5a and 5b in FIG. 1. In other words, the second boundary cost function of FIG. 1 can be determined by configuring second elementary cost functions in such a way that markings 32 lie on lines 5a and 5b. Dashed lines 5a and 5b in FIG. 1 thus indicate the positions at which the second boundary cost function decreases from maximum cost value 33. While the first elementary cost function is embodied to avoid a collision with a static object, the second elementary cost function is embodied to maintain a safe distance from a static object. This safe distance corresponds in FIG. 2 to the distance between markings 22 and 32.

FIG. 2 furthermore depicts a third elementary cost function by way of dotted curve 40. In a first region to the left of marking 41, first elementary cost function 40 is constantly equal to a minimum cost value that can be equal to zero. In a second region to the right of marking 41, the third elementary cost function rises. The third elementary cost function has a low steepness. Marking 41 in FIG. 2 can correspond to dotted lines 6a and 6b in FIG. 1. In other words, the third boundary cost function of FIG. 1 can be determined by the fact that third elementary cost functions are configured so that markings 41 lie on lines 6a and 6b.

Dotted lines 6a and 6b in FIG. 1 thus indicate the positions at which the third boundary cost function begins to rise.

FIG. 2 illustrates that the elementary cost functions can have different steepnesses. When determining the boundary cost functions, the respective elementary cost functions are to be directed toward objects. Shift parameters, which can assume different values for different elementary cost functions, can play a role in this context. In general, the shift parameter is a distance between a reference point of the elementary cost function and a position of the object toward which the elementary cost function is directed in the context of determining the respective boundary cost function. For example, if marking 22 is selected as a reference point for the first elementary cost function, and if in the determination of the first boundary cost function that reference point coincides with the position of the object for which a collision is to be avoided, the shift parameter would then be zero.

If, conversely, marking 32 is selected as a reference point for the second elementary cost function, the shift parameter of the second elementary cost function would then correspond to the safe distance that is to be maintained from the static object. For example, marking 41 could be used as a reference point for the third elementary cost function.

In principle, the fourth, fifth, and sixth elementary cost functions can each have a profile similar to those of the first, second, and third elementary cost functions. The fourth, fifth, and sixth elementary cost functions can, however, respectively differ considerably from the first, second and third elementary cost functions in particular with regard to steepness and shift parameters. For example, the safe distance to be maintained from a dynamic object can be much greater than the safe distance to be maintained from a static object, thus resulting in different shift parameters for the second and the fifth elementary cost functions. Similarly, the distance between a preferred static driving region and a static object (for instance, a lane boundary line) can be less than the distance between a preferred dynamic driving region and a dynamic object (for instance, an other vehicle). In this regard as well, different shift parameters occur for the third and the sixth elementary cost functions.

The elementary cost functions are preferably continuous functions, in order to avoid abrupt changes in motion control. The elementary cost functions are furthermore preferably convex functions in their first and second regions, in order to simplify the search for a global total cost minimum.

What is claimed is:

1. A computer-implemented method for calculating a trajectory of a mobile platform, comprising:
   calculating the trajectory by solving an optimization problem, a total cost function of the optimization problem depending on a first boundary cost function, the first boundary cost function being a function of a position of the mobile platform which has a continuous and non-constant portion; and
   furnishing, based on the calculated trajectory, a control signal for applying control to a steering system of the mobile platform, and/or a control signal for applying control to a propulsion system of the mobile platform, and/or a control signal for applying control to a braking system, and/or a warning signal for warning an occupant of the mobile platform.

2. The method as recited in claim 1, further comprising:
   determining the first boundary cost function based on a classification of a first object as a static or dynamic object, on a position of the first object, and on an elementary cost function from a set of elementary cost functions, the set of elementary cost functions including: a first elementary cost function for avoiding a collision with a static object, and/or a second elementary cost function for maintaining a safe distance from a static object, and/or a third elementary cost function for conforming to a preferred static driving region, and/or a fourth elementary cost function for avoiding a collision with a dynamic object, and/or a fifth elementary cost function for maintaining a safe distance from a dynamic object, and/or a sixth elementary cost function for conforming to a preferred dynamic driving region.

3. The method as recited in claim 2, wherein the total cost function of the optimization problem further depends on a second boundary cost function, the second boundary cost function depending on the position of the first object, and wherein the first and the second boundary cost function are based on different elementary cost functions.

4. The method as recited in claim 2, wherein the first elementary cost function has a higher steepness than the second elementary cost function, and/or the second elementary cost function has a higher steepness than the third elementary cost function, and/or the fourth elementary cost function has a higher steepness than the fifth elementary cost function, and/or the fifth elementary cost function has a higher steepness than the sixth elementary cost function.

5. The method as recited in claim 2, wherein the elementary cost function on which the first boundary cost function is based is continuous and non-constant in at least one portion.

6. The method as recited in claim 2, further comprising:
receiving user inputs; and
configuring a specific elementary cost function from the set of elementary cost functions based on the user inputs, the configuration of the specific elementary cost function including configuration of a shift parameter and/or configuration of a steepness of the elementary cost function.

7. The method as recited in claim 1, wherein the total cost function of the optimization problem depends on a comfort cost function, and/or on a travel path cost function, and/or on a target speed function.

8. A data processing system configured to calculate a trajectory of a mobile platform, the data processing system configured to:
calculate the trajectory by solving an optimization problem, a total cost function of the optimization problem depending on a first boundary cost function, the first boundary cost function being a function of a position of the mobile platform which has a continuous and non-constant portion; and
furnish, based on the calculated trajectory, a control signal for applying control to a steering system of the mobile platform, and/or a control signal for applying control to a propulsion system of the mobile platform, and/or a control signal for applying control to a braking system, and/or a warning signal for warning an occupant of the mobile platform.

9. A non-transitory computer-readable memory medium on which is stored a computer program for calculating a trajectory of a mobile platform, the computer program, when executed by a data processing system, causing the data processing system to perform:
calculating the trajectory by solving an optimization problem, a total cost function of the optimization problem depending on a first boundary cost function, the first boundary cost function being a function of a position of the mobile platform which has a continuous and non-constant portion; and
furnishing, based on the calculated trajectory, a control signal for applying control to a steering system of the mobile platform, and/or a control signal for applying control to a propulsion system of the mobile platform, and/or a control signal for applying control to a braking system, and/or a warning signal for warning an occupant of the mobile platform.

10. The non-transitory computer-readable memory medium as recited in claim 9, wherein the computer program includes a configuration module and a motion control module, the configuration module being embodied to configure elementary cost functions based on user inputs, and the motion control module being embodied to solve the optimization problem.

* * * * *